US012103215B2

(12) United States Patent
Besnard et al.

(10) Patent No.: US 12,103,215 B2
(45) Date of Patent: Oct. 1, 2024

(54) DEVICE FOR MANUFACTURING AN ELECTRODE FOR A BATTERY COMPRISING AN EXTRUDER HAVING A CURRENT COLLECTOR

(71) Applicant: RENAULT S.A.S, Boulogne-Billancourt (FR)

(72) Inventors: Nicolas Besnard, Paris (FR); Victor Chaudoy, Paris (FR)

(73) Assignee: Ampere S.A.S., Boulogne-Billancourt (FR)

( * ) Notice: Subject to any disclaimer, the term of this patent is extended or adjusted under 35 U.S.C. 154(b) by 186 days.

(21) Appl. No.: 17/788,646

(22) PCT Filed: Dec. 15, 2020

(86) PCT No.: PCT/EP2020/086244
§ 371 (c)(1),
(2) Date: Jun. 23, 2022

(87) PCT Pub. No.: WO2021/130065
PCT Pub. Date: Jul. 1, 2021

(65) Prior Publication Data
US 2023/0027498 A1     Jan. 26, 2023

(30) Foreign Application Priority Data
Dec. 24, 2019   (FR) ...................... 1915588

(51) Int. Cl.
*B29C 48/25*     (2019.01)
*B29C 48/154*    (2019.01)
(Continued)

(52) U.S. Cl.
CPC ........ *B29C 48/2522* (2019.02); *B29C 48/154* (2019.02); *B29C 48/505* (2019.02);
(Continued)

(58) Field of Classification Search
CPC . B29C 48/2522; B29C 48/154; B29C 48/505; B29C 48/91; B29C 48/30; B29K 2995/0005; B29L 2031/3468
See application file for complete search history.

(56) References Cited

U.S. PATENT DOCUMENTS

2019/0048493 A1     2/2019  Ong
2021/0170661 A1 *   6/2021  Hinc .................. B29C 48/12

FOREIGN PATENT DOCUMENTS

JP      2003217372 A  *  7/2003  ............. B29C 48/06

OTHER PUBLICATIONS

International Search Report issued Mar. 3, 2021 in PCT/EP2020/086244 filed on Dec. 15, 2020, citing documents AA & AO therein, 2 pages.

(Continued)

*Primary Examiner* — Nahida Sultana
*Assistant Examiner* — Mohamed K Ahmed Ali
(74) *Attorney, Agent, or Firm* — Oblon, McClelland, Maier & Neustadt, L.L.P.

(57) ABSTRACT

A device manufactures an electrode strip for a battery including a current collector strip and at least one layer of electrochemically active composite material on either side of the current collector strip. The device includes an extruder including a sheath, an extrusion head, and an extrusion screw. The extrusion screw includes an outer tube and an inner tube that are coaxial and fitted into one another. The outer tube is mounted so as to be rotatably movable relative to the sheath. The inner tube is stationary relative to the sheath and includes an outlet located upstream of the extrusion head. Moreover, the manufacturing device includes advancing and unwinding structure to convey the current collector strip through the inner tube and up to the extrusion head.

9 Claims, 4 Drawing Sheets

(51) Int. Cl.
 *B29C 48/505* (2019.01)
 *B29C 48/80* (2019.01)
 *B29C 48/91* (2019.01)
 *B29L 31/34* (2006.01)

(52) U.S. Cl.
 CPC ............ *B29C 48/802* (2019.02); *B29C 48/91* (2019.02); *B29K 2995/0005* (2013.01); *B29L 2031/3468* (2013.01)

(56) References Cited

OTHER PUBLICATIONS

French Preliminary Search Report issued Aug. 20, 2020 in French Application 19 15588 filed on Dec. 24, 2019, citing documents AA & AO therein, 3 pages (with English Translation of Categories of Cited Documents).

\* cited by examiner

DEVICE FOR MANUFACTURING AN ELECTRODE FOR A BATTERY COMPRISING AN EXTRUDER HAVING A CURRENT COLLECTOR

TECHNICAL FIELD OF THE INVENTION

The present invention relates to the field of electric batteries composed of negative electrodes and positive electrodes.

The invention relates more particularly to a device for manufacturing an electrode for a battery.

PRIOR ART

In the field of electric batteries, in particular lithium batteries, electrodes in the form of a thin plate comprising at least one layer of electrochemically active composite material, deposited on a current collector, are known. The current collector is generally formed of a thin layer of metal, for example a layer of aluminum for the positive electrode.

WO 2004/051769 A2 discloses a method for forming a battery electrode using an extrusion device. Specifically, this extrusion device comprises a co-extrusion station with two extruders and a rolling station. The co-extrusion station forms an assembly combining a layer of electrically active composite material and a layer of electrolyte. The assembly leaving the co-extrusion station is then rolled on a current collector in the rolling station to form an electrode unit.

The rolling station comprises two counter-rotating cylinder rollers exerting pressure to assemble the assembly leaving the co-extrusion station and the current collector. To ensure uniform flatness, tension rollers are fitted downstream of the rolling station to maintain tension on the current collector strip.

However, the structure of the extrusion device described above is complex. It requires two extruders as well as a rolling station. The cost of installing and using this device is therefore high.

Moreover, given that the electrode is assembled by rolling two solid elements, it is thus difficult to control their subsequent adhesion.

In view of the aforementioned problem, one aim of the invention is to simplify the device for manufacturing the electrodes, and therefore to reduce the cost of installing and maintaining said device. Furthermore, another aim of the invention is to ensure that the various layers of the electrode are firmly adhered to one another.

SUMMARY OF THE INVENTION

With this aim in mind, the invention proposes a device for manufacturing an electrode strip for a battery, said electrode strip comprising at least one layer of electrochemically active composite material on either side of a current collector strip, the manufacturing device comprising:
an extruder comprising:
a sheath delimiting a mixing chamber,
an extrusion head giving the electrode strip leaving the extruder its shape; and
an extrusion screw arranged in the mixing chamber.
According to the invention, the extrusion screw comprises:
an outer tube mounted such that it rotates on itself in the mixing chamber, said outer tube comprising drive means configured to mix the active composite material in the mixing chamber and to cause said material to move downstream toward the extrusion head;
an inner tube arranged at least partially inside the outer tube and coaxially with said outer tube, said inner tube being stationary relative to the sheath and comprising an outlet located upstream of the extrusion head.

Furthermore, according to the invention, the manufacturing device comprises advancing and unwinding means configured to convey the current collector strip through the inner tube as far as the extrusion head.

Thus, the deposition of the layer of electrochemically active composite material on the current collector is carried out inside the extruder.

Because it is in liquid form in the extruder, the layer of composite material adheres perfectly to the current collector strip and is distributed uniformly over said strip. The quality of adhesion between the layers is thereby improved.

Moreover, the structure of the proposed device is simplified, since it comprises a single extruder. Although the extruder is made up of two different tubes, these are arranged one inside the other to form a compact arrangement allowing the extruder screw to take up the same volume as the extruder screw of a conventional extruder in the mixing chamber.

According to other features of the invention:
the inner tube and the advancing and unwinding means are arranged relative to one another in such a way as to place the current collector strip in suspension inside the inner tube;
the sheath has a shape of revolution, the axis of revolution of which is coincident with a main axis of the extrusion screw; and the main axis of the extrusion screw is in a plane passing through the current collector strip;
the inner tube includes an end head located outside the outer tube and formed by a smooth wall;
in accordance with the previous point, the end head comprises a hemispherical part and the outlet is placed at the tip of said hemispherical part;
the manufacturing device comprises a sealing member arranged between the end head and the outer tube;
in accordance with the previous point, the end head comprises a cylindrical skirt facing an annular portion of the outer tube; and the sealing means is sandwiched between said cylindrical skirt and said portion of the outer tube;
the manufacturing device comprises means for tensioning the current collector strip;
the manufacturing device comprises a heating means arranged around the extruder;
the manufacturing device comprises an electrode drying means arranged downstream of the extruder.

BRIEF DESCRIPTION OF THE FIGURES

Further features and advantages of the invention will become apparent from reading the detailed description below, for the understanding of which reference will be made to the appended drawings in which.

DETAILED DESCRIPTION OF THE INVENTION

Figure 1:
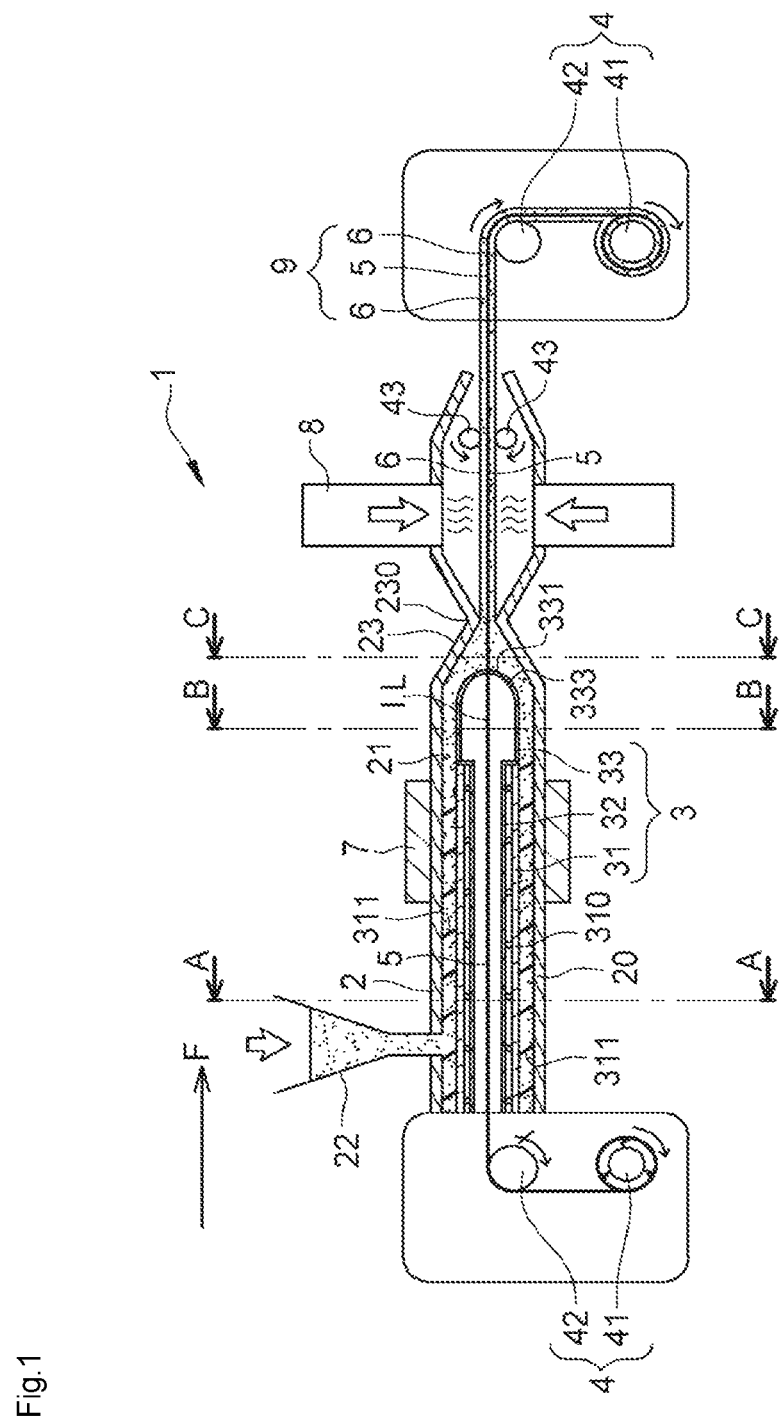
FIG. 1 is a schematic view showing a longitudinal section through an electrode manufacturing device according to one embodiment of the invention.
Figure 2:
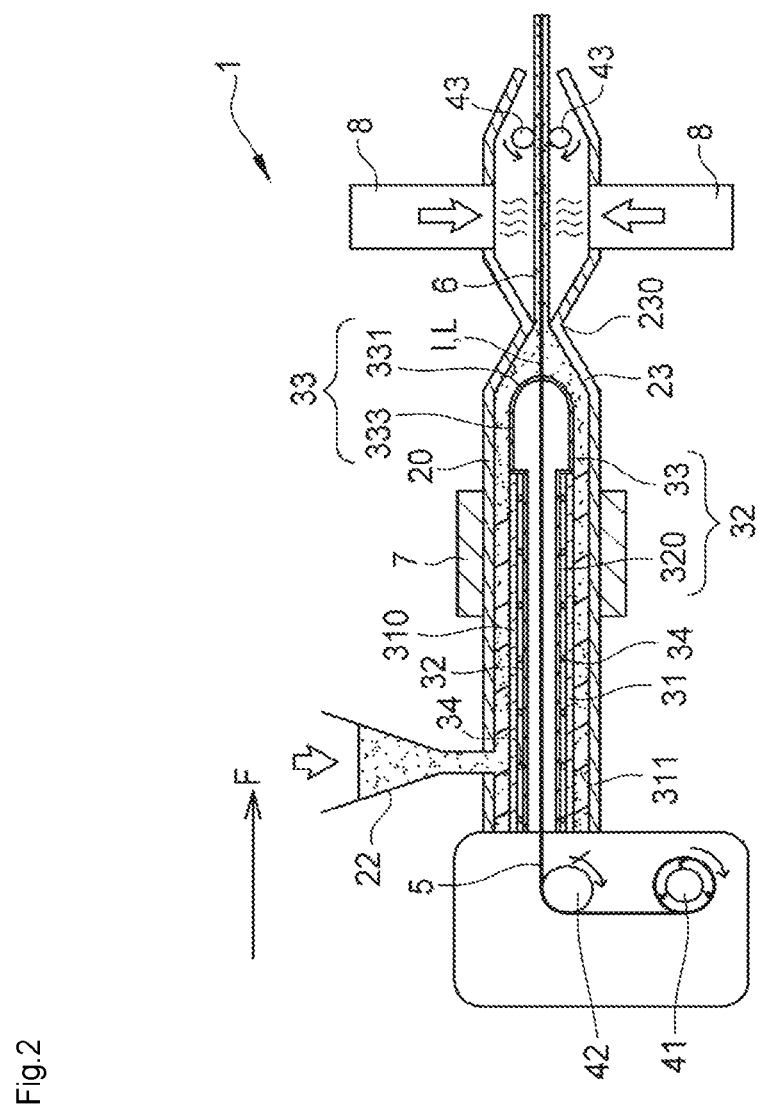
FIG. 2 is the same view as FIG. 1 and shows in more detail an extruder and a drying means forming part of the electrode manufacturing device of FIG. 1.

FIG. 1 and FIG. 2 show an electrode manufacturing device 1, hereinafter referred to as the device 1, which has the function of forming a continuous electrode strip 9 composed of a current collector strip 5 and two layers of electrochemically active composite material 6 arranged on either side of the current collector strip 5.

In the example illustrated, the device 1 comprises an extruder 2 into which is introduced an electrochemically active composite material in liquid or powder form. In this case, "electrochemically active composite material" means a mixture of materials comprising one or more electrochemically active materials (example: active materials such as $LiNi_xMn_yCo_zO_2$ or graphite), one or more electronically conductive additives (example: carbon black), and one or more polymer binders (example: polyvinylidene fluoride). In the case of an all-solid-state battery, the mixture may include one or more ionic conductive materials of the polymer and/or ceramic type (example: poly(ethylene oxide)+LiTFSI).

The electrochemically active composite material, once placed in the extruder, is mixed and pushed from upstream to downstream in a direction of extrusion indicated by the arrow F in FIG. 1. In the rest of the description, the electrochemically active composite material will be referred to as the composite.

In this example, the extruder 2 comprises a cylindrical sheath 20 fixed around the axis of revolution L, and a frustoconical extrusion head 23 formed in one piece with the sheath 20. The sheath 20 delimits a mixing chamber 21 and is oriented such that the axis of revolution L of the sheath 20 is parallel to the direction of extrusion F. The extrusion head 23 comprises a die 230 which delivers the electrode strip 9 with a rectangular cross section. Naturally, the die 230 may be designed differently to give other shapes to the electrode strip 9.

The extruder 2 includes a feed hopper 22 in communication with the mixing chamber 21, into which the composite is poured to feed the extruder 2.

In addition, the extruder 2 comprises an extrusion screw 3 arranged in the mixing chamber 21 such that the main axis I of the extrusion screw 3 coincides with the axis of revolution L of the sheath 20.

According to the invention and as in this example, the extrusion screw 3 comprises an outer tube 31 mounted such that it rotates on itself in the mixing chamber 21. The outer tube 31 comprises a cylindrical trunk 310 and a blade 311 arranged helically around the trunk 310. When the outer tube 31 is rotating, the blade 311 is in motion, mixes the composite and causes it to advance longitudinally downstream in the direction of extrusion F. The rotation of the outer tube 31 is controlled by a motor, not shown in the figures.

In other words, the blade 311 and the motor constitute drive means for mixing the composite and for causing said material to move toward the extrusion head 23.

The extrusion screw 3 also comprises an inner tube 32 having a diameter smaller than that of the outer tube 31 and a length greater than that of the outer tube 31. The inner tube 32, thus designed, is arranged partially inside the outer tube 31 and coaxially with said outer tube 31.

Specifically, the inner tube 32 is composed of a cylindrical part 320 and an end head 33. The cylindrical part 320, having a length substantially equal to that of the outer tube 31, is located inside the outer tube 31. As for the end head 33, this is located outside the outer tube 31. In other words, the end head 33 is located after the mixing section where the outer tube 31 and its blade 311 are located.

Figure 4:
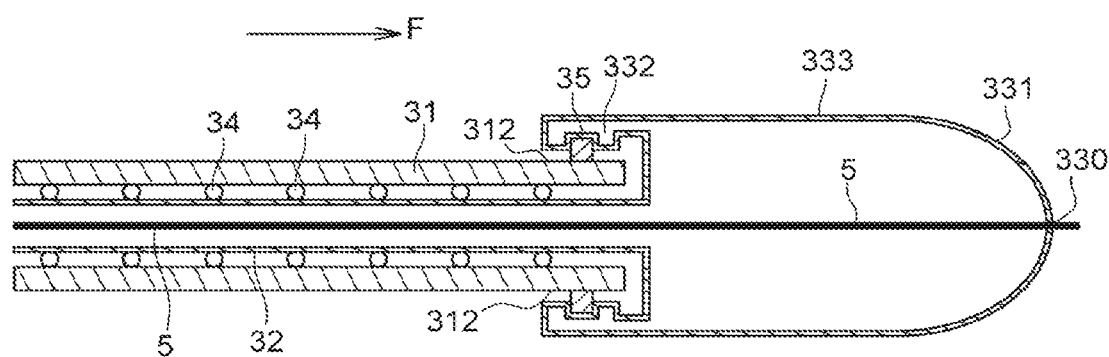
FIG. 4 is a schematic view showing a longitudinal section through an extrusion screw forming part of the electrode manufacturing device of FIG. 1.

As shown in FIGS. 1, 2 and 4, the end head 33 comprises a cylindrical part 333 followed by a hemispherical part 331. Seen from the side, the end head 33 in the example has the shape of a bullet.

A through slot 330 is made in the tip portion 331. The through slot 330 is oriented in a transverse direction T perpendicular to the direction of extrusion F. The direction of extrusion F and the transverse direction T lie in a horizontal plane.

Furthermore, the inner tube 32 is stationary relative to the sheath 20 and therefore does not follow the rotational movement of the outer tube 31. In this case, ball bearings 34 are placed between the two tubes so as to make the movement of the two tubes independent.

During the operation of the extruder 2, there is the risk that the composite, moved by the outer tube 31 and by its drive means, will get into the space between the outer tube 31 and the inner tube 32. To prevent such infiltration, a sealing member is placed between the two tubes.

In this case, a sealing member 35 is placed at the end head 33. To be specific, as can be seen in FIG. 4, the end head 33 comprises a cylindrical skirt 332 oriented parallel to the direction of extrusion F.

The cylindrical skirt 332 faces an annular portion 312 of the outer tube 31.

The sealing member 35 is interposed between the cylindrical skirt 332 and the annular portion 312. In this case, the sealing member 35 may be a lip seal or a sealed ball bearing making it possible to respect both the rotation of the outer tube 31 and the immobility of the inner tube 32.

According to the invention and as in the example illustrated, the device 1 further comprises advancing and unwinding means configured to convey the current collector strip 5 in the direction of extrusion F through the inner tube 32 as far as the extrusion head 23. The current collector strip 5 leaves the extruder 2 through die 230.

In this case, the advancing and unwinding means comprise two pairs 4 of rotary rollers arranged respectively upstream and downstream of the extruder 2. Each of the pairs 4 is composed of a lower roller 41 for unwinding and an upper roller 42 for advancing.

The two pairs of rotary rollers 4 are positioned at the same height to ensure that the current collector strip 5 is parallel to the direction of extrusion F. Furthermore, the pairs of rotary rollers 4 are positioned with respect to the extruder 2 such that when the current collector strip 5 enters the interior of the inner tube 32, this strip is in suspension, i.e. it is not in contact with the walls of the inner tube 32. To facilitate the suspension of the strip 5, in addition to the positioning of the pairs of rotary rollers 4 with respect to the extruder 2, the current collector strip 5 may be dimensioned such that its width is less than the diameter of the inner tube 32. In this way, friction between the current collector strip 5 and the inside of the inner tube 32 is avoided.

Figure 3:
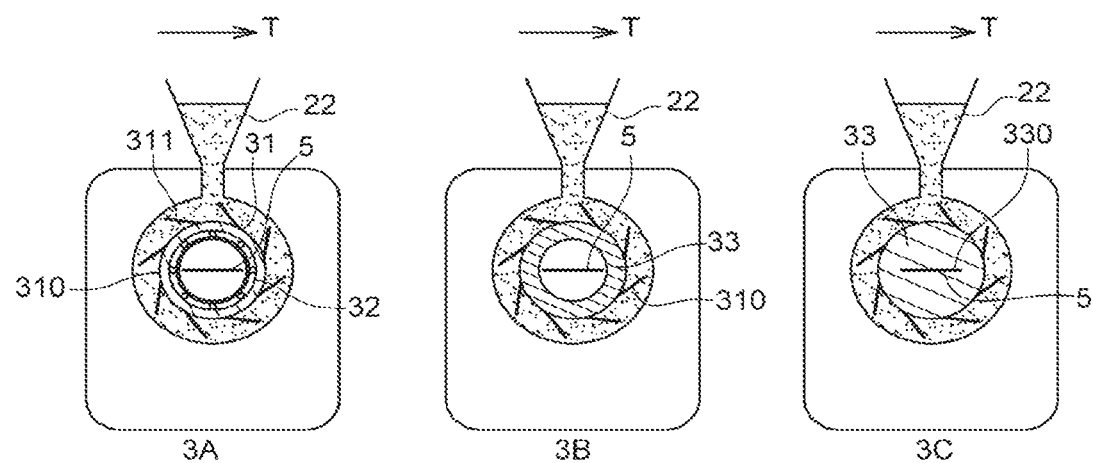
FIG. 3 comprises three schematic views 3A to 3C showing the cross section through the electrode manufacturing device of FIG. 1 in three planes A-A, B-B and C-C illustrated in FIG. 1, respectively.

The suspended state of the current collector strip 5 in the inner tube can be seen in FIGS. 3A and 3B.

In FIG. 3C, it can be seen that the current collector strip 5 leaves the inner tube 32 through the through slot 330, the cross section of which is slightly larger than that of the strip to prevent any contact between the slot 330 and the strip 5. The through slot 330 constitutes the outlet of the inner tube 32. The arrangement between the pairs of rotary rollers 4 and the extruder 2 may also be made such that the current collector strip 5 is in a symmetrical plane of the extruder 2. In this case, the symmetrical plane of the extruder 2 is the horizontal plane passing through the axis of revolution L of the sheath 20, and therefore through the main axis I of the screw 3, since these two axes are coincident. As the current collector strip 5 is positioned in the symmetrical plane, it is covered on both sides by the same quantity of composite on leaving the inner tube 32. This guarantees a balanced distribution of the pressure on each side of the current collector strip 5, which makes it possible to prevent it from twisting or coiling.

Furthermore, the geometry of the end head 33 also helps prevent deformation of the current collector strip 5 during the deposition of the composite thereon. To be specific, as explained above, the end head 33 is formed of a smooth wall. This makes it possible to reduce the rotational movement of the composite when it comes into contact with the end head, such that the composite is advanced by a translational movement.

Furthermore, thanks to the rounded shape of the hemispherical part 331, the composite is gradually guided toward the outlet 330 from which the current collector strip 5 emerges. Thus, the deposition of the composite on the collector strip is carried out in a fluid and finely tuned manner.

At the outlet of the extruder 2, a double-coated electrode strip is obtained composed of a current collector strip 5 and two layers of composite 6 located on either side of the collector strip.

Optionally, to facilitate mixing of the composite within the mixing chamber, a heating device 7 may be arranged around the sheath 20.

The device 1 further comprises a drying means 8 placed downstream of the extruder 2 to fix the layers of composite 6 on the current collector strip 5. The drying means 8 may use cold air or hot air depending on the nature of the composite.

The drying means 8 is followed by a rolling station 43 comprising two counter-rotating rollers between which the dried electrode strip passes.

After this rolling step, the electrode strip 9 is wound around a mandrel to form an electrode coil ready for storage. Alternatively, the double-coated electrode strip is then cut to create individual electrodes.

The electrodes formed from the electrode strip 9 make it possible to reduce the number of current collectors in a battery, and therefore to reduce the size of the battery. The battery of smaller size thus responds to the constraints linked to the increasingly restricted space available in the engine compartment.

The invention claimed is:

1. A device for manufacturing an electrode strip for a battery, said electrode strip comprising at least one layer of electrochemically active composite material and a current collector strip, the manufacturing device comprising:
   an extruder comprising:
      a sheath delimiting a mixing chamber,
      an extrusion head giving the electrode strip leaving the extruder its shape; and
      an extrusion screw arranged in the mixing chamber,
   wherein the extrusion screw comprises:
      an outer tube mounted such that it rotates on itself in the mixing chamber, said outer tube comprising drive means to mix the active composite material in the mixing chamber and to cause said material to move downstream toward the extrusion head, and
      an inner tube arranged at least partially inside the outer tube and coaxially with said outer tube, said inner tube being stationary relative to the sheath and comprising an outlet located upstream of the extrusion head; and
   advancing and unwinding means to convey the current collector strip through the inner tube as far as the extrusion head.

2. The device as claimed in claim 1, wherein the extruder and the advancing and unwinding means are arranged relative to one another in such a way as to place the current collector strip in suspension inside the inner tube.

3. The device as claimed in claim 1, wherein:
   the sheath has a shape of a cylinder, an axis of revolution of which is coincident with a main axis of the extrusion screw; and
   the main axis is in a plane passing through the current collector strip.

4. The device as claimed in claim 1, wherein the inner tube includes an end head located outside the outer tube and formed by a smooth wall.

5. The device as claimed in claim 4, wherein the end head comprises a hemispherical part and the outlet is placed at a tip of said hemispherical part.

6. The device as claimed in claim 4, further comprising a sealing member arranged between the end head and the outer tube.

7. The device as claimed in claim 6, wherein the end head comprises a cylindrical skirt facing an annular portion of the outer tube, and the sealing means is inserted between said cylindrical skirt and said portion of the outer tube.

8. The device as claimed in claim 1, further comprising a heater arranged around the extruder.

9. The device as claimed in claim 1, further comprising a dryer arranged downstream of the extruder.

* * * * *